United States Patent [19]

Adams

[11] Patent Number: 4,965,943
[45] Date of Patent: Oct. 30, 1990

[54] WORKPIECE JOINT-FORMING TEMPLATE SYSTEM

[76] Inventor: Phillip A. Adams, 2542 Tartan Dr., Santa Clara, Calif. 95051

[21] Appl. No.: 404,710

[22] Filed: Sep. 8, 1989

[51] Int. Cl.⁵ .......................... G01B 3/02; B27M 3/00
[52] U.S. Cl. ........................................ 33/758; 33/759; 144/144 R; 144/144.5 R; 144/372
[58] Field of Search .................... 33/494, 758, 759; 144/144 R, 144.5, 372

[56] References Cited

U.S. PATENT DOCUMENTS

| | | | |
|---|---|---|---|
| 2,932,897 | 4/1960 | Huber | 33/758 |
| 3,936,944 | 2/1976 | Byne | 33/759 |
| 4,351,113 | 9/1982 | Eggertsen | 33/758 |

*Primary Examiner*—W. Donald Bray
*Attorney, Agent, or Firm*—Skjerven, Morrill, MacPherson, Franklin & Friel

[57] ABSTRACT

A template system has a series of individual joint-forming templates partially die-cut in a transparent flexible plastic sheet reverse-side printed with a series of linear indicia parallel to each other indicating the position of each cut to be made in a first workpiece. A second series of linear indicia parallel to each other and different in physical appearance in color, line weight or line type, dotted or solid, than the first series of indicia, indicate the position of each cut to be made in a second workpiece. The executed cuts on the two workpieces results in an interfitted joint between the workpieces such as a dovetail or box joint. A number of bands or templates are contained on a plastic sheet which are adhesively mounted on a paper substrate. A full die cut is provided at one end of the strip forming a lift tab which is used to aid in shearing off the partially die-cut strip from a matrix of other strips also partially die cut, so that the individual template strip reference and edge can be mounted in a positioning jig or on a tool work surface at a reference position dictated by the position of the tool bit and the cutting apparatus fence. The jig and/or the cutting fence is then moved in accord with the indicia markings on the strip for each cut to be made on both workpieces in seriatim.

15 Claims, 3 Drawing Sheets

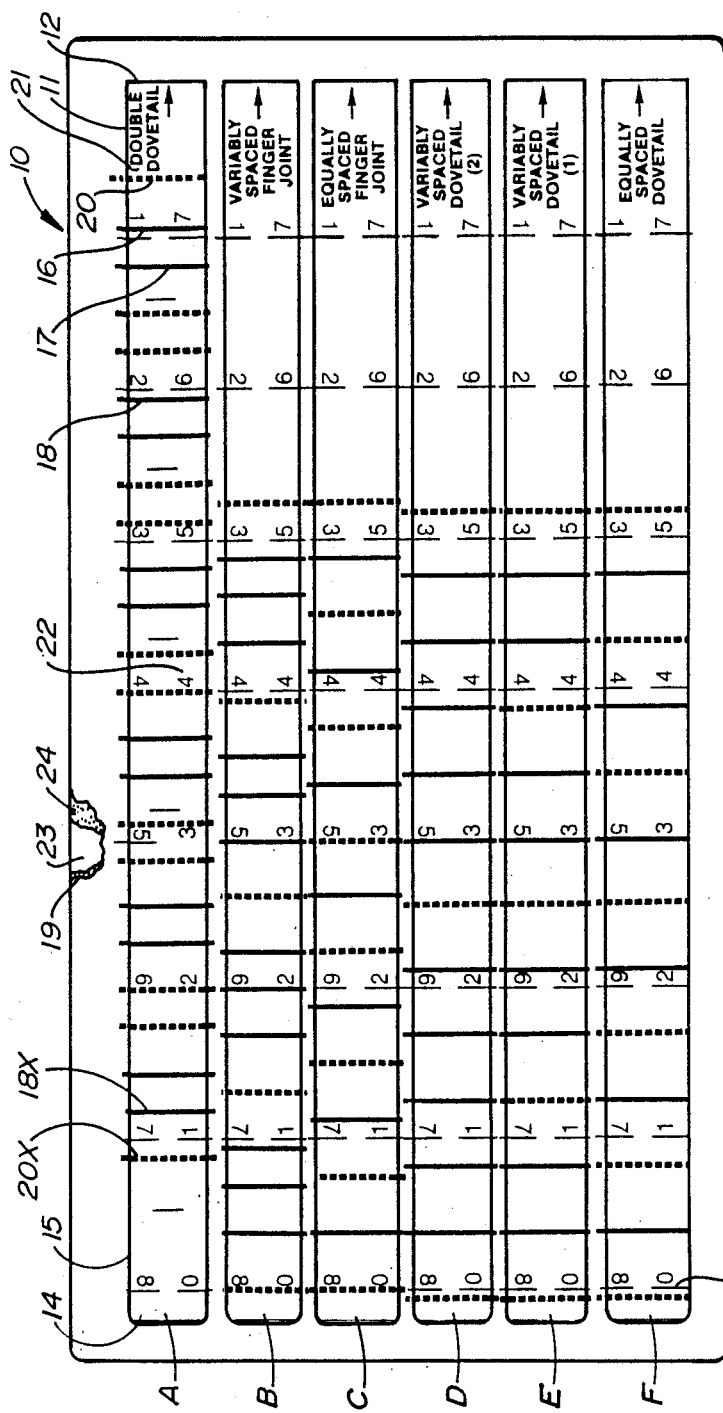
FIG._1
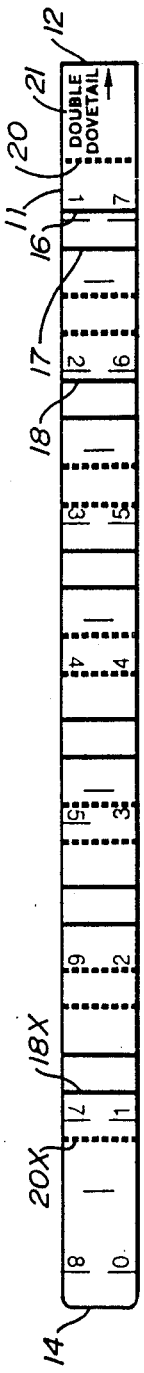
FIG._2

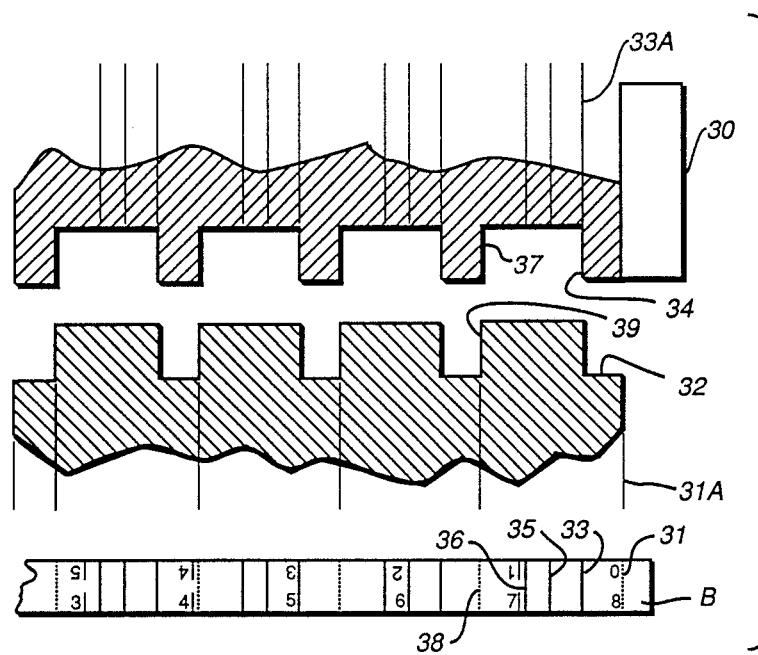
FIG._3
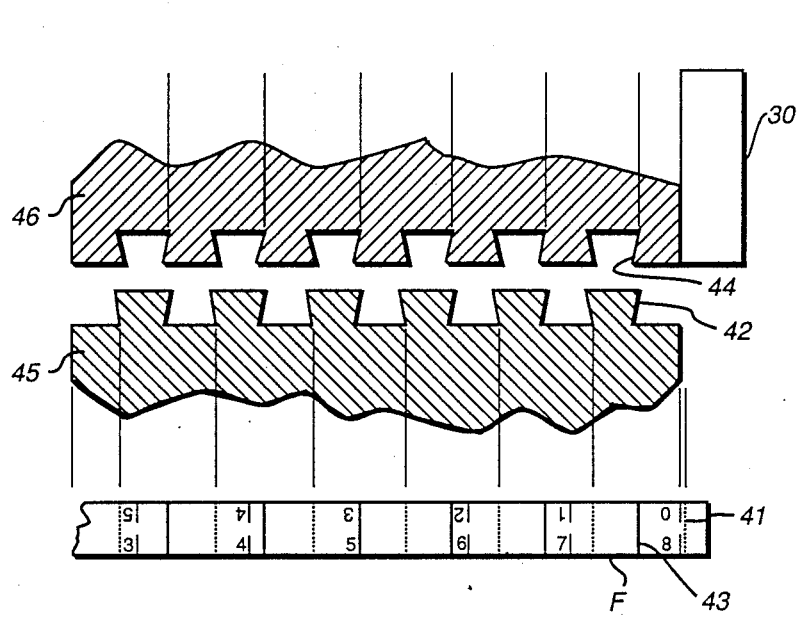
FIG._4

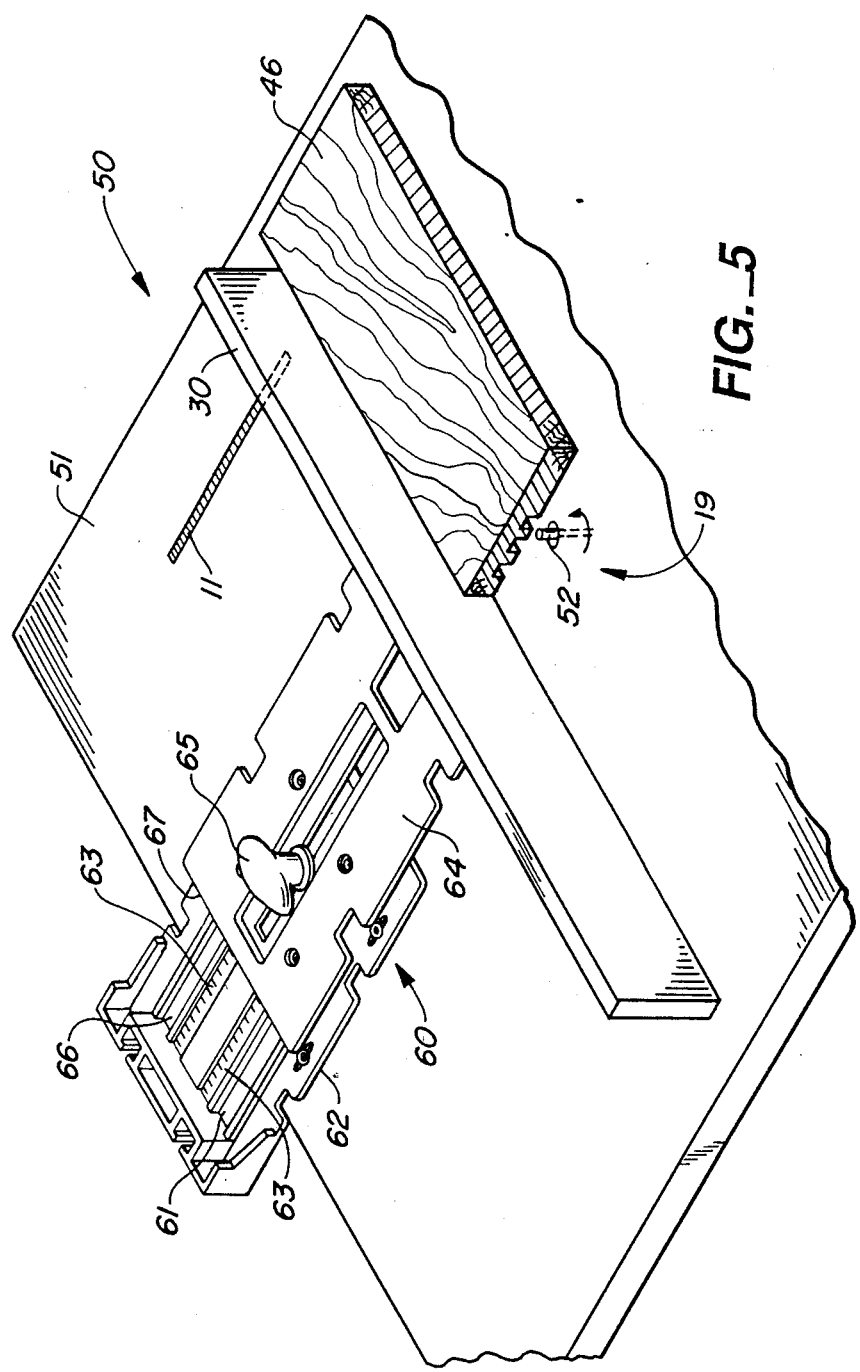
FIG._5

WORKPIECE JOINT-FORMING TEMPLATE SYSTEM

FIELD OF THE INVENTION

This invention relates to woodworking apparatus more particularly to a template system which permits a woodworking tool operator to easily and quickly perform and repeat tool set-ups in making various workpiece joints.

BACKGROUND OF THE INVENTION

The formation of dovetail and finger (or box) joints in woodworking by those in the woodworking trade or by the home-hobbyist normally involves tedious set-ups and mathematic procedures to assure properly sized and positioned wood cuts on each of the two (or more) workpieces to be cut and eventually joined together. Key to the formation of proper cuts is the need to precisely position each workpiece relative to the cutting tool such as a router bit or circular saw of standard or dado configuration. This alignment is normally accompanied by the use of a feed "fence" positioned along the tool work surface which allows an operator to feed a workpiece in abutment along the fence into the rotating tool for effecting a wood cut in the workpiece. In the case of dovetail and finger joints, both of equal or variable spacing, this has necessitated detailed calculations and alignment or measurement of the distance between the fence abutting surfaces and the desired position and width of the desired multiple parallel cuts in each workpiece. Since each workpiece in a joint are cut differently so as to be interfit with each other upon joint assembly, the fence must be adjusted for multiple different cuts on each workpiece, again lengthening and making more complicated the set-up time and effort for each cut. Obviously, this adds cost to the making of the joints for those making wood or plastic articles for sale.

A recent U.S. Pat. No. 4,793,604 discloses a jig for maintaining a workpiece in a predetermined position relative to a cutting tool which includes an end attached to the woodworking apparatus fence which jig allows precision movement of the fence in 1/32 inch (0.794 mm) intervals by movement of channels along a pair of toothed racks having teeth spaced at such intervals. The racks extend at right angles to the fence and includes a measuring scale to read the distance in inches and make measurements thereon from a bi-directional predetermined "zero" position. Portions of the jig can be moved along the racks and then locked in place to properly position the fence with respect to the cutting tool for a desired workpiece cut. In some applications two jigs are employed to position a workpiece in two axes. Incidental to the sale of the '60 patent jig termed an "INCRA JIG," an Owner's Manual is supplied which gives the actual measurements within 1/32 inch (0.0794 cm) for a variety of finger and dovetail joints which can be made utilizing the jig. The jig itself is clamped to the tool work surface and a moveable end of the jig attached to the fence. The clamp is knob-loosened and the one part of the jig attached to the fence moved along the parallel racks to a desired position as shown on the 1/32 inch scale exposed on the fixed part of the jig. The knob is then tightened and the fence is then in a position for the first cut. The procedure is repeated for each cut on a first workpiece and then repeated for each of the different cuts on a second workpiece, which workpieces will be later joined at the compatible cuts made in the respective workpieces.

An additional flat elongated slot is provided in the jig for an auxiliary metric scale for use in marking cuts in accord with metric metrology. The Owners Manual states also "If you are using your INCRA JIG to make a series of cuts, such as dovetails, or a series of grooves or holes, it is often easier to first use a pencil mark to record all of the INCRA JIG settings for that series, before you start making your cuts. To do this, place a strip of masking tape in the auxiliary scale slot. Then with a pencil, place a mark on the tape at all of the INCRA JIG settings involved in the series. This enables you to quickly align your INCRA JIG on the pencil marks without having to remember the actual scale readings. The tape is easily replaced when you are ready to begin a different series of cuts."

This above jig is shown in part in FIG. 5 where jig 60 has one element 62 fixed in a C-clamp or the like (not shown) to a tool work surface 51 of a wood working tool 50 having a rotatable router bit 52 extending vertically therefrom. A pair of parallel racks 63 extend along the top surface of element 62. Similar interfitting racks (not shown) are provided on the underside of the other jig element 64 which is connected to fence 30. Knob 65 is loosened to move the element 64 tooth-by-tooth along element 62, to move the fence toward or away from the router bit so as to allow cutting of a workpiece 46 guided into the router bit while in abutment along the fence 30 to effect the desired cut groove in the workpiece. Slot 66 contains the measurement scale and slot 61 is the above described auxiliary slot.

SUMMARY OF THE INVENTION

The present invention provides a woodworker tool user with any one of a whole set of premarked templates for making a variety of joints in wood (or plastic) workpieces. The templates eliminate all the tedious set-up and mathematical measuring steps normally involved in making dovetail and finger joints. A whole series of templates or bands in the form of elongated flexible transparent plastic strips are precision die-cut to fit into the auxiliary slot of the Incra Jig positioning jig. The template system is formed on a thin plastic sheet having a self-stick, repositional adhesive on its underside so that the plastic sheet can be mounted on a protective relatively stiff paper substrate.

Each template band is pre-printed preferably on the reverse surface of the sheet (before the adhesive is applied to that surface) so that printed indicia is visible through the strip. This prevents any rubbing off of the printed indicia during use. Each strip contains a reference end edge orthogonal to the longitudinal axis of the strip and various linear indicia means extending orthogonally across the strip. Once the strip reference edge is set in the auxiliary slot in the jig so that the arrowed reference end edge abuts the end of the slot against an upstanding rear wall of the bottom of the jig and in alignment with a zero position in the molded-in scale in the other slot or is otherwise properly located on a work table surface of the tool with respect to the fence, the first linear indicia indicates a fence position relative to the cutting tool for executing a first cut in the workpiece. Second and succeeding indicia locate the fence position for second and succeeding linear parallel cuts in the workpiece. Further, the strips contain additional linear indicia for cutting a second workpiece which additional indicia have a different visual appearance, e.g., different colors and/or dotted rather than solid line, than the indicia for the first workpiece. Thus, one template can be employed for making the cuts on both workpieces which are to form the complete joint. The above color and line-coded indicia gives quick and perfect repetition of each cut each time on the respective workpieces to be joint-formed.

In the manufacture of the template system after pre-printing of plastic elect with multiple bands of template strips representing indicia for a variety of joints an adhesive such as 3M #9449 self-stick repositionable adhesive is applied to the underside of the sheet and the sheet adhered to the paper or other substrate. Each template or band is partially die-cut from the plastic sheet with a strip end opposite the reference end edge fully die-cut to form a lift tab so that each template, when being originally used, can be lifted at that lift tab edge and the remainder of that strip sheared from the matrix of templates along the partially die-cut lines including the reference end edge. After use in making all the cuts required for the joint between both workpieces, the template may be readhered to the paper substrate or stored by adhering it on an inside cover of an accompanying instruction manual.

BRIEF DESCRIPTION OF THE DRAWING

FIG. 1 is a plan view of a template system showing six template strips on a single substrate.

FIG. 2 is a plan view of a single template strip.

FIG. 3 is a partial cross-sectional schematic view of a typical variably finger joint and an plan view of an associated template strip used in making the necessary tool cuts.

FIG. 4 is a partial cross-sectional schematic and view of an equally spaced dovetail joint with an associated plan view of a template strip for executing the cuts.

FIG. 5 is a perspective view of a wood working apparatus work surface showing use of the template strips in a positional jig thereon.

DETAILED DESCRIPTION

The template system 10 as shown in FIG. 1 is constructed by first providing a transparent flexible sheet 19 of polycarbonate plastic (0.015 inches in thickness) and of generally rectangular shape. A matrix of template systems are formed on one large plastic sheet so that the entire template system 10 can be cut therefrom. Printing and die cutting operations may be done or a single sheet 19 on an overall plastic sheet from which a series of sheets 19 can be excised. In order to prevent obliteration of the indicia lines to be printed on the plastic sheet, a reverse printing operation is preferred where the underside of the plastic sheet is printed with the necessary indicia so that it is visible through the transparent sheet at the top surface. Each plastic strip is formed by partially die cutting the sheet 19 along lines 11 extending along the outer longitudinal edges of the to-be-formed strip and at a reference end 12 orthogonal to the longitudinal axis of the strip. The opposite end of the strip is full die cut to form a lifting tab 14 at that end. A first indicia line 16 extends orthogonally across the strip and generally slightly into the frame surrounding the die cut lines 11, 12, and 14. In FIG. 1 band A by tab 14 has been removed from the matrix and readhered to the substrate 23 so there is not perfect alignment of the band indicia with the ends of the printed indicia remaining on the frame outside the die cut lines. It is to be noted that all the other bands B-F have indicia lines which are intact and intersect the die cut lines. Indicia line 16 is a solid black line which indicates a position spaced from the fixed reference end 12 in amount for locating a cutting tool first position relative to a workpiece for executing a first cut in a first workpiece. The second indicia line 17 represents the position of a second cut in the workpiece which may either represent an entirely new cut for a second groove to form a small dovetail (FIG. 4), for example, or a second pass in order to form a wider groove, (FIG. 3) such as a wide finger groove extending parallel to the first indicia line 16. Succeeding indicia lines 18 through 18x all black solid lines extend continuously in spaced parallelism over the entire length of the template strip. The succeeding linear indicia lines locate the cutting tool for the third and succeeding positions relative to said workpiece for executing third and succeeding cuts in the first workpiece extending parallel to the first workpiece cut. Also contained on the strip are a series of dotted indicia lines 20–20x which normally are color-coded red or other contrasting color to visually indicate to the operator that he is now orienting and positioning the fence and associated jig, if the latter is used in a position to make the necessary cuts in a second workpiece which cuts will be complimentary to the cuts made with use of the solid and black lines of the template strip for making the first workpiece. The indicia are fairly wide of the order of about 0.040 to 0.050 inches so that the aligning edge can be positioned to bisect the wide indicia line and so that the line is highly visible.

When the two sets of indicia (black solid lines and red dotted lines, respectively) are utilized, the result will be the formation of a line of parallel cuts in two workpieces, which workpieces when inter-fitted will form, for example, a dovetail joint or a finger joint. The template strips also contain informational indicia 21 indicating the type of joint to be made with the particular strip. For example, band A or strip A is a "double dovetail". Further an arrowhead is provided next to the referenced end edge 12 to further indicate to a user that this is the key edge for lining up the strip at the rear of the auxiliary slot of the jig shown in the '604 patent or work table surface as shown in FIG. 5 so that it provides the proper reference for moving the fence in relationship to the cutting tool. Also contained on the strip are number integers 22 which represent full inch measurements from a zero position or "one" position on the strip. Other bands B, C, D, E, and F are similarly made on the plastic strip 19 having been on the plastic strip sheet 19 with the proper spacing of linear indicia for the particular joint and similarly die cut after mounting by adhesive 24 to the paper substrate 23. Each template system 10 which has either been individually been made or die cut from a larger matrix of template systems is then packaged in a slip-in envelope and sold to the customer with an instruction manual.

Upon prospective use by the customer, the template system is removed from the envelope and the particular template excised from the matrix of templates A-F by lifting up the lift tab 14 and shearing along the partially die cut lines 11 and 12 so as to remove the elongated template strip from the matrix strips. This result is a strip shown in FIG. 2 which is then mounted in a jig or on the top surface of the work table with the end 12 in predetermined spacial relationship to the fence. The fence position is first set so that it abuts the cutter. At this position, the strip notations "0"and "8" denoted by numeral 25 in FIG. 1 are in alignment with the rear edge of the top half of the jig. In the event a jig is not used, the "0" and "8" lines 25 are set in position with the face of the fence abutting the cutter and offset laterally as shown in FIG. 5. As illustrated, template or band B may be employed for making a variably spaced finger joint; band C used for making an equally spaced finger joint; band D for a variably spaced dovetail of one size; band E used for making a variable spaced dovetail of another size; and band F used for making an equally spaced dovetail. It is of course contemplated that any number of bands may be employed on the template system to make various sizes and spacings and types of dovetail, and finger or other joint cuts.

FIG. 3 illustrates more clearly the function of the strip B from a spatial orientation standpoint. For example, first indicia line 33 is aligned to make the first cut of a groove 34 as shown by mythical line 33A in FIG. 3. The next position of the jig or fence, as the case may be, will correspond to indicia line 35 which will cut a medial part of groove 34 in the upper workpiece. A third or succeeding line 36 completes the cut to edge 37 forming the relatively wide groove 34 which has necessitated an aggregate of three cuts by the cutting tool. Subsequently, each set of three solid black lines is used to make succeeding spaced wide grooves in the upper first workpiece. When the first workpiece is completed, a second workpiece as shown by the lower cross-sectional workpiece is placed in position next to the fence 30 and the jig or fence setting set correspondingly to the red dotted lines on the strip or band B. The first cut of a groove 32 is based on the position of the fence dictated by the dotted and/or contrasting color indicia line 31 and shown by mythical line 31A. The next cut is for groove 39 which is made after the jig or fence has been set at red dotted indicia line 38. It should be noted that there is only one pass of a cutter to make the relatively small grooves 32, 39. In actual practice using the jig illustrated in FIG. 5, the jig is clamped relative to the tool so that the position of the strip in the auxiliary slot is aligned with the transverse straight edge 67 to the jig movable element 64 and the fence in position to make the prescribed first cut by passing a workpiece along the fence so that the tool 52 makes the desired first cut.

FIG. 4 illustrates the use of the black solid indicia lines 43 and the dotted red indicia lines 41 for making the respective grooves 44 and 42 in two workpieces 46 and 45 to make a dovetail joint of equal spacing. It should be noted that each of the grooves 42, 44 are made by one pass and so each solid line 43 is equally spaced with the second and succeeding solid lines and likewise each dotted red line is succeeded by a second and succeeding dotted red lines to indicate those cuts necessary to make the grooves in the second workpiece 45.

In operation, the fence setting is based on the zero referenced position of the template strips, namely at the zero "0" or "8" inch inch mark shown in FIG. 3 at the dotted line 31 and in FIG. 4 adjacent to dotted line 41. Insofar as the cutting sequence is concerned, both workpieces should be cut from the inside to the outside edge. That is, the first cut should be on the edge nearest to the fence. On the open ended outside cut of the bottom section, each edge should first be lightly scored to avoid splintering before doing the remainder of the cut.

The invention also contemplates having template strips for making other types of joints such as double dovetail joints. In these, there are four different series of cuts: two series for the middle section and one each for the top and bottom sections of an overall joint which is made up of three distinct parts. Each series of lines may be indicated with different type which is superimposed on the dimension lines. These lines correspond to similar line types on the template. Half lines may also be employed for the upper and lower cuts in the middle section. The wider grooves of the top and bottom sections are normally achieved by making two passes at the two indicated setting. In the case of double dovetails, the top and middle sections require negative fence settings. This means that the bit is cutting into the fence by the amount indicated. The templates assume a zero reference point of, say seven inches, unlike eight inches as the other templates do. This means that the outer cutting wing of the bit just "kisses" the surface of the fence when the jig is set to seven inches. A rubber sole pushblock should be used in directing each of the workpieces into the cutter edge. Normal rules for pushing the wood in proper direction relative to the bit in order to avoid grabbing, kick-back or splintering should be followed. All an operator has to do is to set the jig to the settings marked on the template and make the cuts. If the bit has been set to the proper depth, a perfect fit results in the resultant joint.

The above description of embodiments of this invention is intended to be illustrative and not limiting. Other embodiments of this invention will be obvious to those skilled in the art in view of the above disclosure.

I claim:

1. In combination, a woodworking apparatus including a work surface and associated cutting tool for making predetermined cuts by said cutter tool on a first workpiece, and a template, wherein said template is removably positionable with respect to said work surface at a fixed reference position relative to a desired cutter tool cutting path, said template comprising:

an elongated strip having a fixed reference end edge extending along one end of said strip, said reference end edge being orthogonal to a longitudinal axis of said strip and being adaptable to abut said fixed reference position in parallelism;

first linear indicia means extending orthogonally to and visible on one side of said strip and being spaced from said strip fixed reference end in an amount for locating a cutting tool at a predetermined first position relative to a workpiece for executing a first cut in said workpiece; and second and succeeding linear indicia means on said side of said strip spaced from and parallel to said first indicia means for locating a cutting tool at a predetermined second and predetermined succeeding positions relative to said workpiece for executing second and succeeding cuts in said first workpiece extending parallel to said first work cut.

2. The combination of claim 1 wherein said first, second and said succeeding linear indicia means form a first set of indicia means for locating a first series of spaced cuts in said first workpiece and further including a second set of indicia means having a different visual appearance than said first set of indicia means for locating a second series of cutting tool positions relative to a second workpiece for executing a second series of spaced cuts in said second workpiece; and wherein said workpieces after said first series of cuts and said second series of cuts are made therein interfit to form a wood joint.

3. The combination of claim 2 wherein said first set of linear indicia means are straight full linear lines extending across said strip and said second set of linear indicia means are broken lines.

4. The combination of claim 2 wherein said first and said second set of indicia linear means are of contrasting color.

5. The combination of claim 1 further comprising a series of linear partial lines of different line weight than said first, second and succeeding linear indicia means and equally spaced from said fixed reference edge, said partial lines being representative of a standard ruler incremental spacing and including an integer mark indicative of the number of increments of standard ruler spacings at that location relative to said fixed reference position.

6. The combination of claim 2 wherein said fixed reference position is displaced a fixed distance from a workpiece fence on a workpiece table.

7. The combination of claim 2 wherein execution of said cuts by use of said first and said second sets of linear indicia means results in formation of a dovetail or finger joint between said workpieces when assembled together.

8. The combination of claim 1 further comprising word indicia on said strip indicative of the type of cuts to be executed by use of said template.

9. The combination of claim 1 in which said template is removably adhered to a substrate prior to use, and further comprising a series of additional templates adhered to said substrate to form a template system, each additional template having at least one set of linear indica means and a reference end thereon for locating a cutting tool representative of other desired cuts, said template and said additional templates forming a template matrix contained in a single sheet of plastic adhered to said substrate and formed by partial die cutting of said sheet along an outline of said strip; and wherein an end of each of said templates opposite said reference edge end is fully die cut to form a pull tab whereby a single selected template may be peeled from said substrate shearing said template from said plastic sheet for use.

10. The combination of claim 1 in which said predetermined cuts are finger cuts resulting in a box or dovetail joint between two workpieces.

11. The combination of claim 1 in which said template is transparent and is reversed screenprinted on the reverse side of said strip, said strip indicia being visible from the opposite side of said strip.

12. The combination of claim 1 further comprising a router table jig having a molded-in horizontal scale slot extending longitudinally of said jig, said template being positionable longitudinally in said slot abutting a reference location on said jig.

13. The combination of claim 1 further comprising a fence extending across said work surface and spaced from said cutter tool and wherein said template is positionable with said reference end edge abutting and extending orthogonally from said fence.

14. The combination of claim 1 in which said template is removably adhered to a substrate prior to use, and further comprising a series of additional templates adhered to said substrate to form a template system, each additional template having at least one set of linear indicia means and a reference end thereon for locating a cutting tool representative of other desired cuts, said template and said additional templates forming a template matrix contained in a single sheet of plastic adhered to said substrate and whereby a single selected template may be peeled from said plastic sheet for use.

15. In combination, a woodworking apparatus including a work surface and associated cutting tool for making predetermined cuts by said cutter tool on a first workpiece, and a template, wherein said template is positionable with respect to said work surface at a fixed reference position relative to a desired cutter tool cutting path, said template comprising:

an elongated strip having a fixed reference loci extending along said strip, said reference loci being orthogonal to a longitudinal axis of said strip and being adaptable to be aligned with said fixed reference position in parallelism thereto;

first linear indicia means extending orthogonally to and visible on one side of said strip and being spaced from said strip fixed reference loci in an amount for locating a cutting tool at a predetermined first position relative to a workpiece for executing a first cut in said workpiece; and second and succeeding linear indicia means visible on said one side of said strip spaced from and parallel to said first indicia means for locating a cutting tool at a predetermined second and predetermined succeeding positions relative to said workpiece for executing second and succeeding cuts in said first workpiece extending parallel to said first work cut.

* * * * *

Disclaimer and Dedication

4,965,943 —Philip A. Adams, Santa Clara, Calif. WORKPIECE JOINT-FORMING TEMPLATE SYSTEM. Patent dated October 30, 1990. Disclaimer and dedication filed March 22, 1993, by the inventor.

Hereby disclaims and dedicates to the public the remaining term of said patent.
(*Official Gazette* September 5, 1995.)